United States Patent [19]
Klawuhn et al.

[11] Patent Number: 5,526,733
[45] Date of Patent: Jun. 18, 1996

[54] BREWING DEVICE FOR A HOUSEHOLD EXPRESSO COFFEE MACHINE

[75] Inventors: Manfred Klawuhn, Frankfurt am Main; Walter Hufnagl, Sulzbach; Roland Müller, Dreieich; Gerhard Schäfer, Frankfurt am Main, all of Germany

[73] Assignee: Braun Aktiengesellschaft, Frankfurter, Germany

[21] Appl. No.: 307,809

[22] PCT Filed: Feb. 17, 1993

[86] PCT No.: PCT/EP93/00374

§ 371 Date: Sep. 27, 1994

§ 102(e) Date: Sep. 27, 1994

[87] PCT Pub. No.: WO93/20736

PCT Pub. Date: Oct. 28, 1993

[30] Foreign Application Priority Data

Apr. 11, 1992 [DE] Germany .................. 42 12 288.0

[51] Int. Cl.⁶ ........................................ A47J 31/24
[52] U.S. Cl. ............... 99/287; 99/289 R; 99/302 P
[58] Field of Search .................. 99/295, 287, 297, 99/289 R, 289 D, 300, 302 R, 302 P; 426/433

[56] References Cited

U.S. PATENT DOCUMENTS

| | | | |
|---|---|---|---|
| 1,903,519 | 4/1933 | Snider. | |
| 3,266,410 | 8/1966 | Novi | 99/287 |
| 4,796,521 | 1/1989 | Grossi | 99/297 |
| 5,144,886 | 9/1992 | Geiger | 99/297 |

FOREIGN PATENT DOCUMENTS

| | | |
|---|---|---|
| 1454200 | 11/1968 | Denmark. |
| 1918425 | 11/1970 | Denmark. |
| 0184561 | 6/1986 | European Pat. Off.. |
| 2245318 | 4/1975 | France. |
| 3422432 | 12/1985 | Germany. |
| 3803728 | 8/1989 | Germany. |
| 3400567 | 4/1990 | Germany. |
| 320753 | 3/1955 | Italy. |

*Primary Examiner*—Robert W. Jenkins
*Attorney, Agent, or Firm*—Fish & Richardson

[57] ABSTRACT

The brewing device is composed of a housing part including a piston, vertically slidable in the housing part. On the housing part, a filter basket holder is mounted which is pivoted horizontally about the tilting axis and is provided with a filter basket to be filled with ground coffee. When the piston is lowered and reaches into the filter basket (i.e., its working position), the filter basket forms with it a pressure chamber, in which the ground coffee is enclosed, into which, on the piston side, hot water under pressure is urged through a conduit, and from which, on the filter basket holder side, the prepared espresso coffee beverage is discharged through at least one outlet opening. When the piston is lifted, the filter basket holder with the filter basket can be swung about a vertically extending tilting axis out of the range of effect of the piston. The tilting range of the filter basket holder reaches from its working position to its feed position, in which the filter basket is accessible from the outside. Only in its working position is the filter basket holder secured in respect of the housing part against movement in a vertical direction by supporting elements provided on both the filter basket holder and the housing part.

23 Claims, 6 Drawing Sheets

BREWING DEVICE FOR A HOUSEHOLD EXPRESSO COFFEE MACHINE

The present invention relates to a brewing device for a household espresso coffee machine including a piston, vertically slidable in a housing part, and a filter basket to be filled with ground coffee which is retained in a horizontally movable filter basket holder and which, when the piston is lowered and reaches into the filter basket (working position), forms with it a pressure chamber in which the ground coffee is enclosed, and into which, on the piston side, hot water under pressure is urged through a conduit, and from which, on the filter basket holder side, the prepared espresso coffee beverage is discharged through at least one outlet opening.

An espresso coffee machine including an electrically operated water heater is known, from which the heated water is supplied under pressure to a filter basket holder to be filled with ground coffee (DE 34 00 567 C2). The filter basket holder is composed of a filter holder with a rigidly mounted handle. A detachable filter to accommodate the ground coffee is inserted into the filter holder. After the filling operation of the filter, the filter holder is moved from below to a bayonet-type lock arrangement of the housing of the espresso coffee machine, is inserted into it and, subsequently, is swivelled into a working position. In doing so, the filter holder with the inserted filter is sealed by frictional connection. This working operation is complicated and sometimes even very time-consuming, since, in particular due to the vision being impeded, the filter holder cannot always be inserted accurately into the bayonet-type lock arrangement.

For instance, if the filter holder is not moved accurately, that is coaxially, below the bayonet-type lock and is not inserted straight into the bayonet-type lock, the filter holder may tilt and, thus, be damaged. Further, it is disadvantageous that the pressure chamber is sealed frontally through the abutment edge formed on the filter and a seal provided in the housing part, which is done in the instance of the filter basket holder being rotated. Due to the resulting great pressing forces, the elastic seal tends to escape the pressure by deforming. Frequently, the result is leakiness at this point of sealing.

Another espresso coffee machine of the type initially referred to is known (EP-0 184 561 A1), wherein the filter holder is guided in ribs of a U-shaped mounting support with a rack-and-pinion drive, in order to so displace the filter from a feed position, which serves to take up the ground coffee in the filter basket, to a working position, which serves to form the pressure chamber and, thus, to inject hot water under pressure on the ground coffee. A device of this type is very complicated and expensive and, therefore, is not particularly well suited for household espresso coffee machines.

Further, the Italian patent 520 753 discloses an espresso coffee machine intended for industrial application, wherein four filter basket holding devices are arranged evenly spread over the periphery and serving to make espresso coffee by virtue of a four-station feed unit. In this arrangement, the filter basket holders are rotated about the central axis of the device, but swinging the filter basket holder out of the housing is not possible. Also, the problem of feeding the filter basket holders does not occur, since they are filled automatically, and not manually, by means of the four-station feed unit.

Still further, DE-34 22 432 A1 discloses a machine for making espresso coffee, in which the piston plunging into the filter basket and forming the actual brewing tip can be swung upwards out of the range of effect of the filter basket holder and laterally about an axis provided in the housing of the espresso coffee machine to facilitate feeding and emptying the filter basket. This form of embodiment is only possible since the device has a skeleton-type design and, as a result, is accessible from the front and from the sides. Swinging the brewing device about a shaft, which is arranged roughly in the centre of the machine, necessitates a large amount of free space, the overall size of the machine being considerably increased thereby. Detachment of the filter basket holder for removing the spent ground coffee after each brewing operation is not possible, since the filter basket holder is fixed to the housing and can be freed from the spent ground coffee exclusively by means of an ejector mechanism.

Consequently, the object of the present invention is to provide a low-cost and easy-to-handle filter basket holder including a press-on arrangement for a household espresso coffee machine, which can be fed quickly, without spilling ground coffee, and in which the filter basket holder is stably supported after being swung into the housing part.

This object is achieved according to the present invention in that the filter basket holder with the filter basket, when the piston is lifted, can be swung about a vertically extending tilting axis out of the range of effect of the piston, in that the tilting range of the filter basket holder reaches from its working position to its feed position in which the filter basket is accessible from the outside, and in that the filter basket holder, in its working position only, is secured in respect of the housing part against movement in a vertical direction by supporting elements provided on both the filter basket holder and the housing part. As a result, an easy-to-handle filter basket holder including a press-on arrangement to be operated by hand is provided in a simple manner, which affords fail-free operation because of the favourable design of the press-on arrangement, in particular.

It is ensured by swinging the filter basket holder insert or, respectively, the housing part to the housing of the espresso coffee machine that the filter basket holder insert is always placed exactly beneath the press-on arrangement so that the piston of the press-on arrangement, which is displaceable manually, will not damage the filter basket holder.

Further, the filter basket holder or, respectively, the housing part can be easily swung out of the range of effect of the piston to fill in ground espresso coffee or to remove spent ground espresso coffee, without the necessity of a user's hand having to constantly hold the filter basket holder. The easy insertion of the piston into the pressure chamber, that is, into the space formed by the filter basket and receiving the ground coffee, facilitates to handle the espresso coffee machine, especially since a less problematic sealing is effected by the annular piston seal, the sealing effect of which increases with the rising pressure in the pressure chamber.

The supporting elements according to the present invention, which move into engagement only when the filter basket holder has been swung into the housing part, render it possible at all that the filter basket holder and the filter basket can be swung out of the housing of the espresso coffee machine to the front. Further, on pressurization of the pressure chamber, it is prevented that the filter basket holder escapes this pressure. That means, the support of the filter basket holder is effected not only by virtue of the tilting axis, but, in addition, by means of the supporting elements cooperating at the outside periphery of the pressure chamber between the housing part and the filter basket holder. If a support was effected exclusively by the tilting axis, what would be possible in general, it would be required to have a comparatively complicated and stable design.

When the position of the tilting axis is defined by two points of support which are provided on the housing part and are disposed outside the range of effect of the piston, smaller tilting angles at the filter basket holder are already sufficient to take the filter basket out or to insert it, respectively. Thus, the nearer the tilting axis is moved to the piston, the larger the tilting angles must be, but the smaller is the mounting space needed for the filter basket holder.

The provision of supporting elements around the housing part and the filter basket holder is favourable because a comparatively large supporting surface results which, in its dimensioning, can have comparatively thin walls. It is reinforced, however, when plastics is used as the material for the housing part and the filter basket holder.

To enable the filter basket holder to swing in and out of the housing part unhindered by the supporting elements, those supporting elements which are disposed on top of the sectional plane of filter basket holder and housing part, when the filter basket holder is swung into the housing part, are arranged in the closing direction in the front area, and those supporting elements which are disposed below the partition plane of filter basket holder and housing part, when the filter basket holder is swung into the housing part, are arranged in the closing direction in the rear area. Hence, the support will not perform until the filter basket holder has been swung almost completely into the housing part.

When the supporting elements extend substantially concentrically in relation to the tilting axis of the filter basket holder, the supporting elements do not cause any hindrance during the swing-in action of the filter basket holder.

To transmit the axial forces acting on the filter basket holder during the injection process to the housing part without damaging it, it is suggested that the supporting elements extend in parallel to the sectional plane, and that they are provided with reinforcing ribs which extend transversely to the sectional plane. The substantially parallel course of the supporting elements permits an unhindered swing movement of the filter basket holder into the housing part, until the respectively interacting supporting elements come to be superimposed and in abutment with each other for support. This will not take place until the filter basket holder has moved entirely into the housing part, a stable axial support of the filter basket holder being then effected by the supporting elements in the housing part which interact only in this position.

To be able to lift the filter basket holder from the housing part in the swung-out condition irrespective of the filter basket, as this is the case in the coffee machines of the type "Aromamaster" which the applicant has put on the market since long, it is suggested in an improvement of the present invention that the filter basket holder is furnished with a pivot pin, the ends of which can be hung into the mounting lugs arranged at the housing part, whereby it is secured against movement in a vertical direction. Whenever the filter basket holder is to be cleaned thoroughly, it can be unhinged from the espresso coffee machine extremely easily and quickly.

According to an improvement of the present invention, the piston is provided with a press-on arrangement which is slidable in opposition to the effect of a displacement force and is guided in the housing part. Due to the press-on arrangement slidable in opposition to a displacement force, the piston is moved by hand quickly to the filter basket holder to form the pressure chamber. Subsequent to the brewing operation, the press-on arrangement is decoupled again, and the piston recedes from the filter basket because the displacement force acts on it, thereby permitting the filter basket holder to swing out of the housing part and to thus remove the spent ground espresso coffee from the filter basket. It is favourable that the displacement force is generated by a spring. It is ensured by the press-on arrangement that the piston will always return to its initial position when the brewing operation is completed, or rather the ground coffee need not be compressed any more so that the piston, too, is moved out of the range of effect of the filter basket holder to then swivel the one housing part into a discharge position.

Further, it is advantageous that the guide for the slidable accommodation of the press-on arrangement of the filter basket holder is a cylindrical bore, which is furnished in the stationary housing part of the espresso coffee machine, the bore forming the guide extending in parallel to the tilting axis of the housing part.

An additional aspect according to an improvement of the espresso coffee machine of the present invention is that the press-on arrangement with the associated piston can be moved to automatically adopt a locking position by displacing the press-on arrangement at least to a position in which the ground espresso coffee is compressed. As a result, the piston always reaches a predetermined closing position, that means, the volume of the pressure chamber is almost always identical. Since it is possible in household espresso coffee machines of this type to prepare a maximum of four portions of espresso coffee in one working operation, the volume of the pressure chamber is rated to a quantity of ground espresso coffee for a maximum of four cups.

It is favourable in another embodiment of the present invention that the spring of the press-on arrangement is mounted on a pin, slidably incorporated in the bore, and, with its one end, moves into abutment with a handle furnished at the pin and, with its other end, moves into abutment with the upper side of the injection tip provided in the housing part. The spring is thereby guided and centered in a simple manner, for what reason the piston is not inclined to cant.

A particularly simple press-on arrangement is achieved by providing a locking lever at the housing part which extends transversely in relation to the pin and is swivellable about a supporting surface, because the locking lever, through a fitting bore, tightly encloses the pin and forms a friction-type lock so that the pin is freely adjustable when the locking lever is depressed into an unlocking position and, when the adjusting pressure is removed to cause a locking position, the pin is undisplaceably coupled to the housing part by the locking lever. This press-on arrangement is characterized by being particularly simple. This is because as soon as the bore provided in the locking lever has reached a specific, inclined position in respect of the pin, the pin will cant in the bore, a clamping engagement between these parts ensuing therefrom. As a result, the piston, coupled to the pin, is not allowed to displace in its guide in axially upward or downward direction. A silent ratchet of this type is infinitely variable so that, when the filter basket is filled with more or less ground espresso coffee, the piston is always moved so far into the pressure chamber that its circular surface close to the pressure chamber abuts on the surface of the ground espresso coffee. It is to be understood in this respect that press-on arrangements of different design and other mechanisms for locking and detaching the pistons are possible within the scope of the present invention. For instance, the press-on arrangement according to another invention can comprise a housing assembly provided at the piston system and cooperating with a thread arrangement provided at the housing part so that the desired piston stroke is reached in the event of small tilting angles of the piston system.

To ensure that the canting effect between the bore of the lever and the pin will always occur when a user releases the locking lever, according to an improvement of the present invention, the locking lever is constantly kept in its locking position, in which the pin is held to be unslidable, due to the effect of a compression spring. Due to the additional compression spring, the locking lever, in respect of its point of support at the supporting surface, is always rotated counterclockwise until its bore cants with respect to the pin. This means, a press-on arrangement of this type releases the piston when it is moved towards the filter basket to form a pressure chamber. It is locked when the press-on force applied to the handle of the piston ceases, since then the pin will cant automatically in the bore of the locking lever.

To introduce the hot water into the pressure chamber after it has been formed, according to an improvement of the present invention, the piston is furnished with a jet which is open towards the pressure chamber, and which is connected with a supply device, subjecting the hot water to pressure, through a conduit provided between the piston and the housing part. Thus, the piston communicates through a flexible connecting conduit with a supply pressure device which, after the formation of the pressure chamber, injects hot water under high pressure into it.

To permit ease of handling of the filter basket, while preventing that the hand of a user gets burnt or dirty by ground coffee, it is suggested in an improvement of the present invention that a handle is provided so as to project radially from the filter basket.

Two embodiments of the present invention are illustrated in the drawings and will be described in detail hereinbelow. In the drawings, FIG. 1 is a longitudinal cross-sectional view of a brewing device of an espresso coffee machine, wherein the filter basket holder is swung into the housing part, and the piston is shown in a lifted position, that is the "parking" position, prior to the compression of the ground coffee, the longitudinal cross-section being taken through the central point of the piston and through the tilting axis of the filter basket holder;

Figure 1:
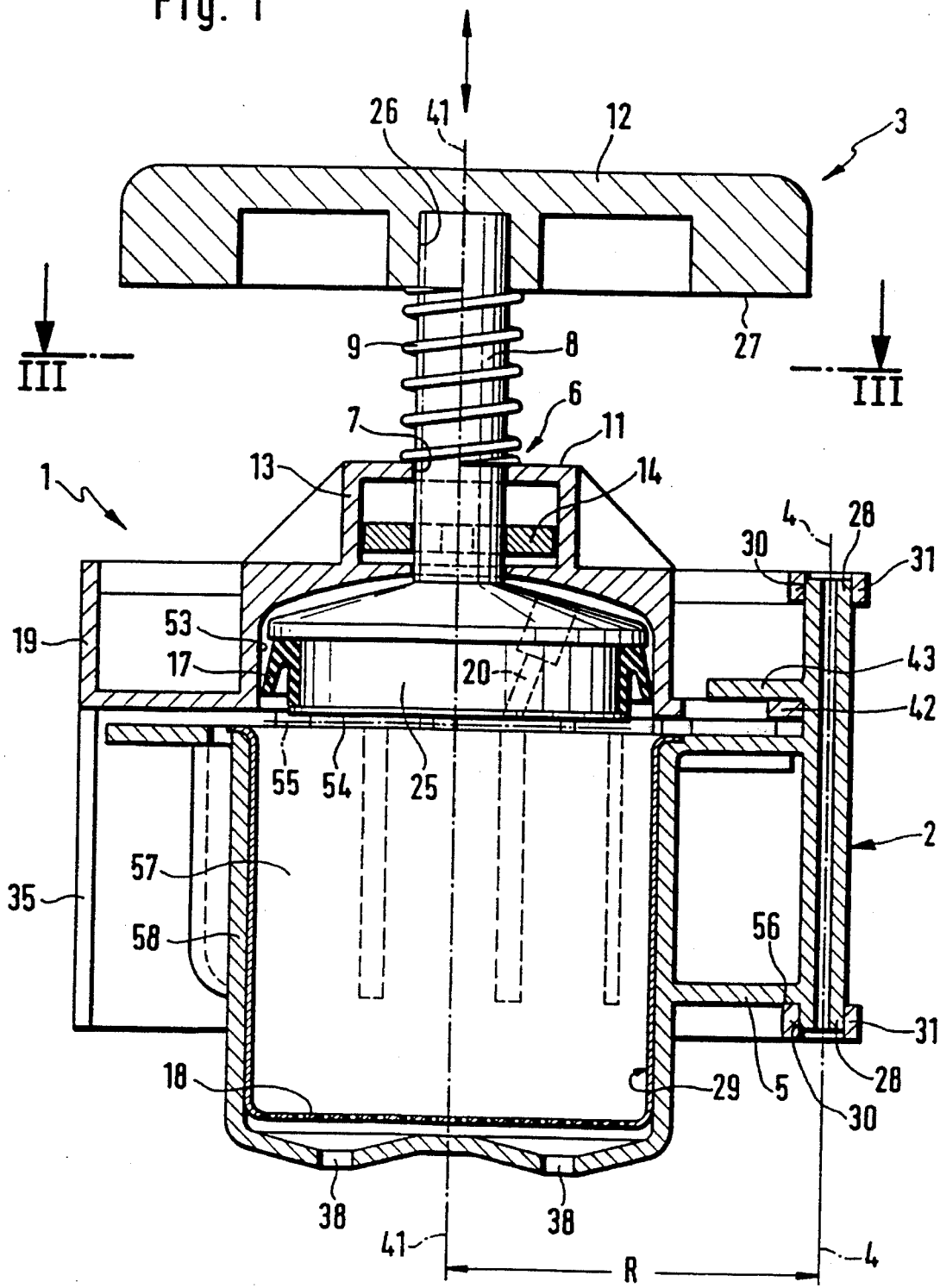

FIGS. 1 to 7 show a filter basket holder 2 of a brewing device 1 tiltably supported in a housing part 19, which brewing device is part of a household espresso coffee machine, not shown in the drawing. Further, the espresso coffee machine comprises a heating unit, not shown in the drawing, in which water is heated which then, exposed to pressure, is supplied to the brewing device 1.

Figure 2:
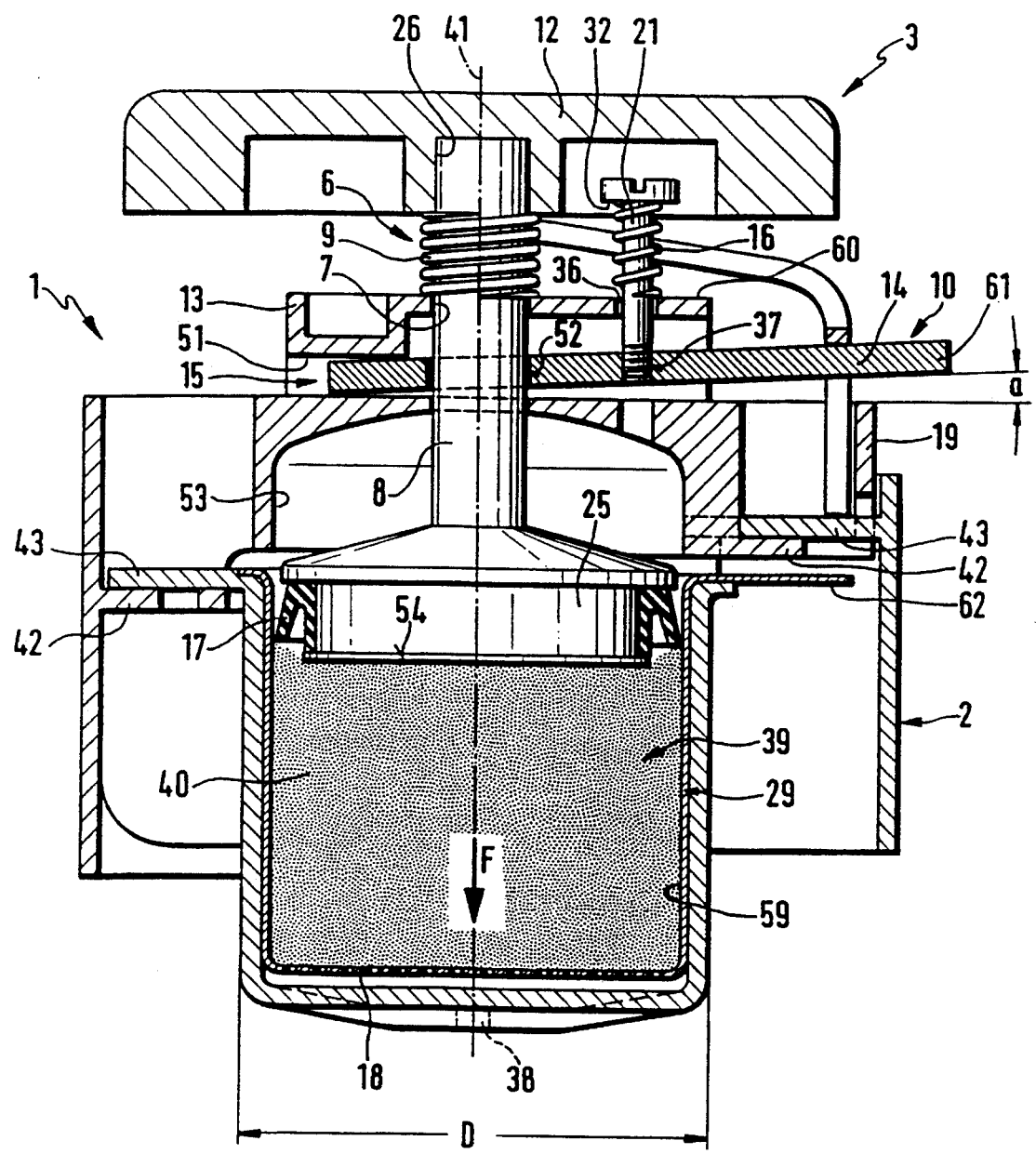
FIG. 2 is similar to FIG. 1, however, the longitudinal cross-section through the brewing device was taken offset by 90° in respect of FIG. 1 through the piston, the piston being arranged in the lower working position after the compression of the ground coffee, that means, in the brewing position.

The brewing device 1 is substantially composed of the housing part 19, fixedly integrated in the espresso coffee machine, at the upper end of which, illustrated in FIGS. 1 and 2, a round handle 12 is provided, which may also have any other design desired, if necessary, may be provided with serrations, and which contains a centrally arranged bore 26 to accommodate, fix and center a pin 8. Pin 8 is slidable in a bore 7 provided as a slide-push guide 6 between a feed position (FIGS. 1, 4, 5, 6 and 7) and a working position (FIG. 2). Bore 7 is arranged in the injection tip 13 of the housing part 19.

Figure 4:
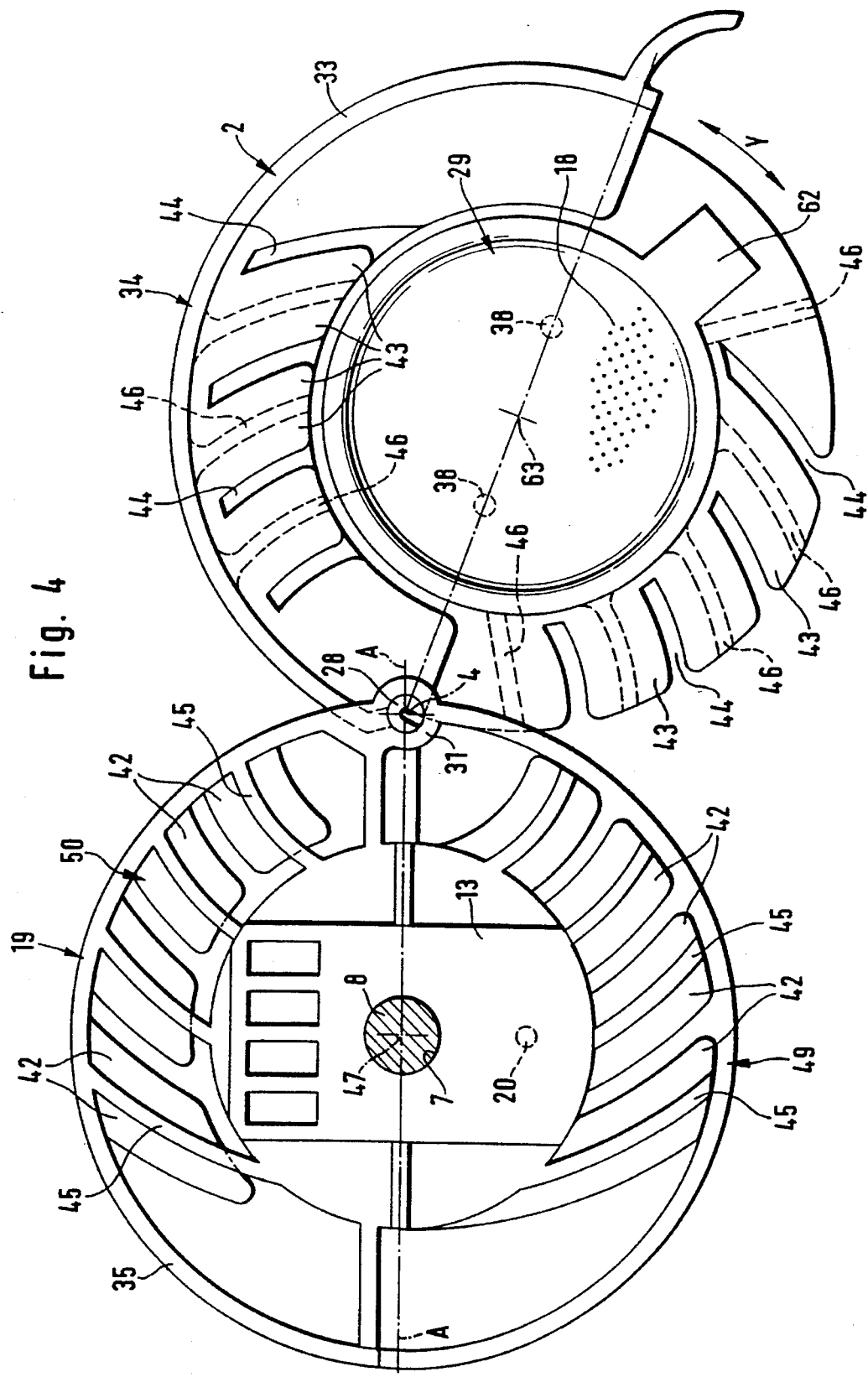
FIG. 4 is similar to FIG. 3, however, the filter basket is swung about the tilting axis out of the housing part and, thus, adopts its feed position.

Interposed between the bottom side 27 of the handle 12 and the upper side 11 of the injection tip 13 is a spring 9, which encompasses the pin 8 concentrically and is centered by it, and the purpose of which is to always displace the handle 12 into its initial position, which is the top position according to FIG. 1 and, simultaneously, is the feed position, when the filter basket holder 2 is to be swung out of the housing part (FIG. 4).

According to FIGS. 1 to 7, the housing part 19 is provided with a bowl-shaped recess 53, which is open towards the filter basket holder 2 and which serves to accommodate a piston 25 connected with the pin 8, when the piston has been moved by the spring 9 of the press-on arrangement 3 to adopt its feed position shown in FIG. 1. In doing so, the piston 25 moves so far into the recess 53 that its front side 54 is placed above the partition plane 55 between the housing part 19 and the filter basket holder 2 so that the filter basket holder 2 can be swung out of the housing part 19, without the piston 25 hindering.

At the housing part 19 in FIG. 1, two mounting lugs 31 are placed perpendicular on top of each other, into which two pivot pins 28 formed at corresponding locations on the filter basket holder 2 can be suspended so that the filter basket holder 2 is adjustable around the so formed tilting axis 4, according to FIG. 2, from its working position for brewing the ground coffee 39 and, according to FIG. 4, from a feed or discharge position, in a horizontal tilting plane to the tilting direction Y, which is at right angles to the tilting axis 4.

Each of the pivot pins 28 of the filter basket holder 2 is accommodated in a bore 30 of the upper and the lower mounting lug 31 at the housing part 19. The tilting axis 4 is disposed outside the range of effect of the piston 25 which can be displaced vertically by the handle 12 according to FIG. 2, and it has a distance R from the longitudinal central axis 41 of the piston 25 which is larger than the housing diameter D of the pressure chamber 40 of the housing part 58 provided at the filter basket holder 2.

According to FIG. 1, the two mounting lugs 31 are spaced from one another at such a distance that the filter basket holder 2, with its two pivot pins 28, can be lifted in a vertical direction until the lower pivot pin 28 can be taken out of the lower bore 30 of the mounting lug 31 serving as a point of support. Subsequently, the filter basket holder 2 can be tilted about its lower pivot pin 28 a little bit, on top of the mounting lug 31, and can be taken out sideways. The process of insertion of the filter basket holder 2 into the housing part 19 is effected accordingly vice-versa, until the transverse wall 5 abuts on the upper side 56 of the lower mounting lug 31, which serves as a point of support. To this end, the upper pivot pin 28 must reach sufficiently far into the bore 30 of the upper mounting lug 31, as can be seen clearly in FIG. 1.

Figure 6:
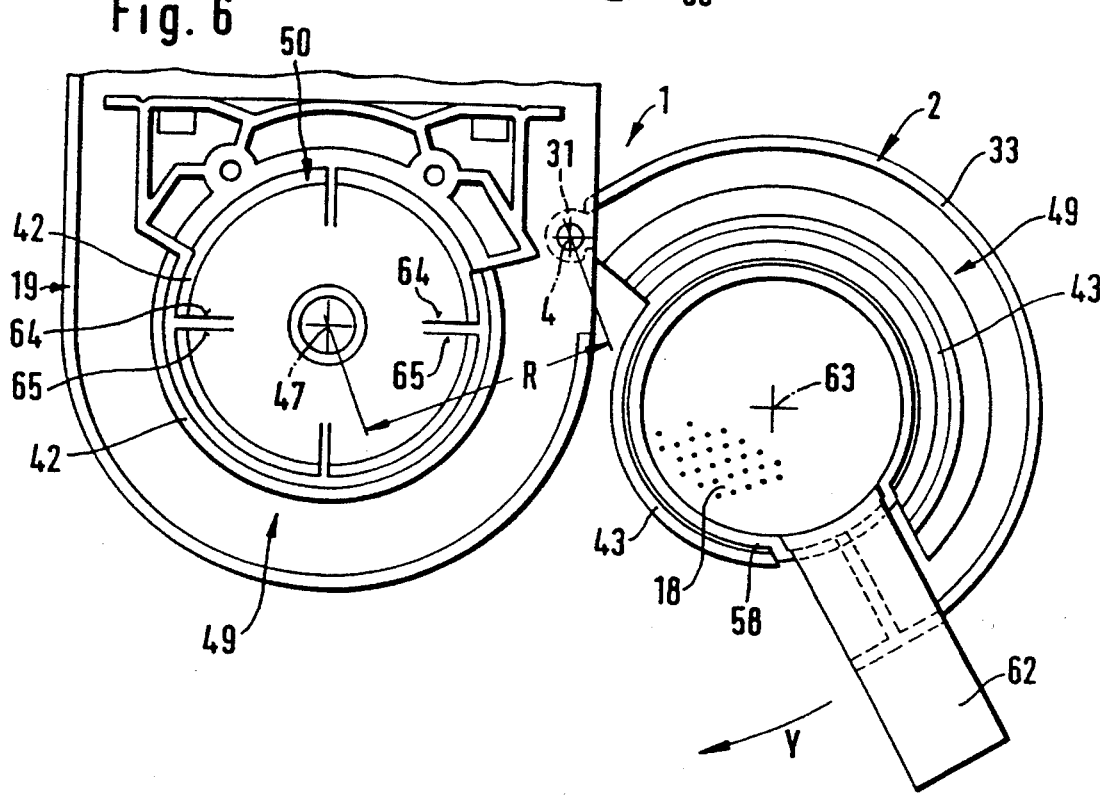
FIG. 6 is a top view on the brewing device according to FIG. 5, however, the filter basket holder being entirely swung out of the housing part, hence, it adopts its feed position.

The filter basket holder 2 comprises a filter basket 29 to be inserted into the cylindrically formed housing portion 58 to accommodate the ground espresso coffee 39 which, in the position of the filter basket holder 2 according to FIGS. 4 and 6, can be filled into the filter basket 29. Subsequently, the filter basket holder 2 is swung from the position according to FIGS. 4 and 6 to adopt the position according to FIGS. 1, 3 and 7 so that the receiving chamber 57, formed by the filter basket 29, is moved precisely below the press-on arrangement 3 including the piston 25. To compress the ground espresso coffee 39 taken up in the filter basket holder insert 29 and to form the pressure chamber 40 (FIG. 2), the piston 25 is slipped into the filter basket holder insert 29 along its longitudinal central axis 41.

As can be seen in FIG. 4 in particular, the housing part 19 is provided with a large number of reinforcing ribs 45, being equally spaced from each other, being arranged on the upper side of supporting elements 42 at the housing part 19 and projecting upwardly and terminating radially outwardly into a cylindrically extending wall portion 35 which confines the housing part 19. Further, the individual reinforcing ribs 45 extend concentrically relative to the tilting axis 4 and extend radially outwardly so that they can be slipped into mating counter parts or cut-out portions 44, which likewise extend concentrically to the tilting axis 4 and which, to this end, are provided on supporting elements 43 of the filter basket holder 2. The supporting elements 43 in the front area 34 of the filter basket holder 2 terminate into a cylinder wall 33 which extends concentrically to the central point 63 and forms a common wall with the wall portion 35 in the working position.

Figure 3:
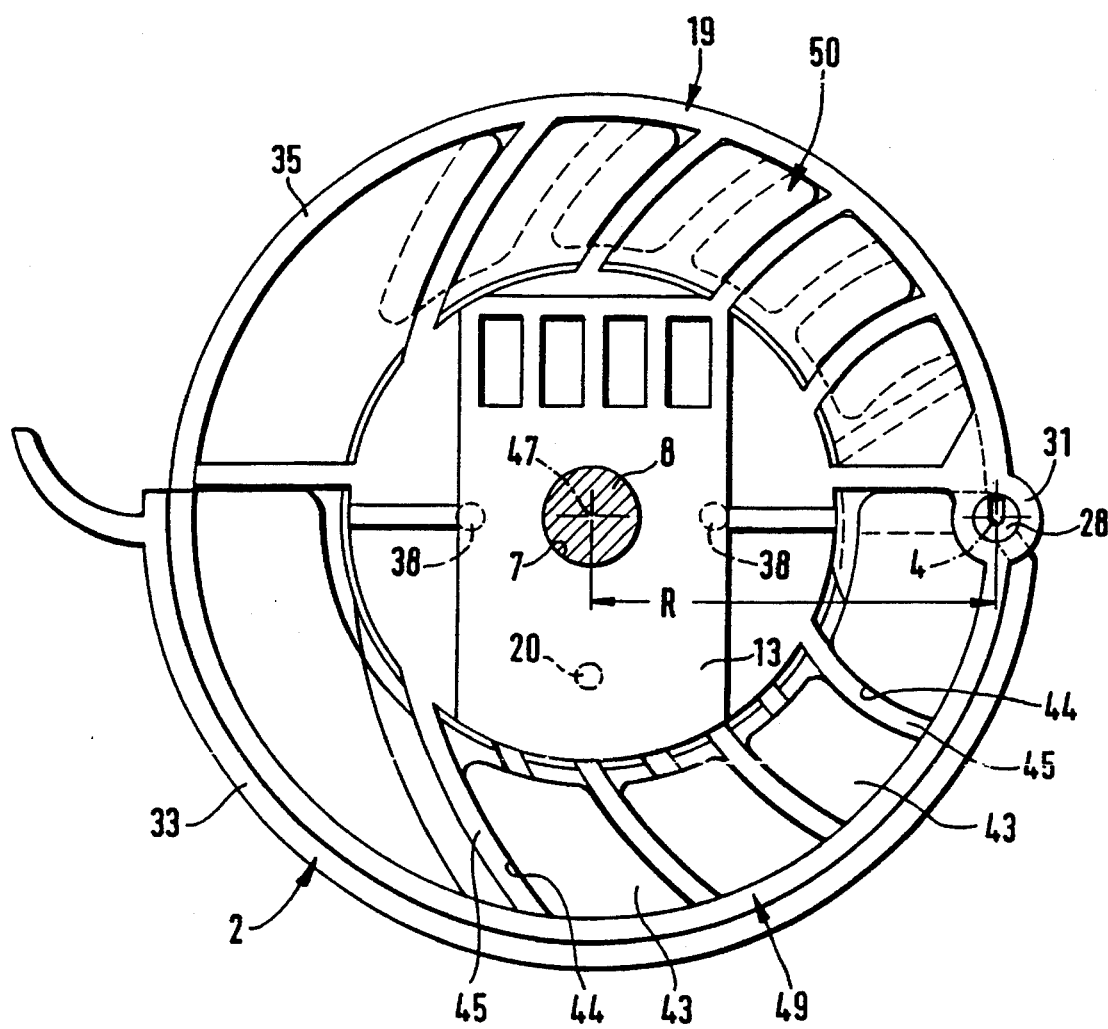
FIG. 3 is a longitudinal cross-section taken through the brewing device along the line of intersection III—III according to FIG. 1.

When the filter basket holder 2 is swung from the position shown in FIG. 4 to the position shown in FIG. 3, the reinforcing ribs 45 of the housing part 19 are moved comb-like into the cut-out portions 44 of the filter basket holder 2. The reinforcing ribs 45 are moved into toothed engagement with the cut-out portions 44 so that a positive connection results when the filter basket holder 2 is in its position swung into the housing part 19 according to FIG. 3. The supporting elements 43 of the filter basket holder 2 take support on the supporting elements 42 of the housing part 19 (FIG. 2). The same applies to the supporting elements 42, 43 in the rear area, which is the upper area according to FIGS. 3 and 4. At this location, too, the reinforcing ribs 45 are engaged into the cut-out portions 44 of the filter basket holder 2.

This means, in the closing position of the filter basket holder 2, the pressure force F, which results during the brewing action in downward direction due to the pressure in the pressure chamber 40 at the filter basket holder 2 according to FIG. 2, is applied through the front and rear supporting elements 43 provided at the filter basket holder 2 outside the housing portion 58 to the corresponding front and rear supporting elements 42 of the housing part 19. Thus, the tilting axis 4 serves exclusively to tilt the filter basket holder 2, but not to transmit forces.

After the ground espresso coffee 39 has been filled into the filter basket 29 inserted already into the filter basket holder 2, the piston 25, by way of the press-on arrangement 3, is displaced from the position according to FIG. 1 to the position according to FIG. 2 due to a user shifting the handle 12 and, thus, the piston 25 so far downwardly that the ground espresso coffee 39 is compressed as a result. It is prevented by the seal 17 provided at the piston 25 that the ground coffee 39 is moved past the piston 25 and, respectively, that the hot water can escape from the pressure chamber 40 upwards. The seal 17 is formed by an annular sealing cup whose sealing effect rises, that means, the higher the pressure is which prevails in the pressure chamber 40, the tighter the sealing cup is pressed against the cylinder wall 59 of the filter basket 29.

As can be seen in FIGS. 1 and 2, the spring 9 is centered on the pin 8 serving to urge the piston 25 always in upward direction. However, to seize the piston 25—in opposition to the force of the spring 9—in the desired position in which the ground coffee 39 is compressed, the press-on arrangement 3 is equipped with a locking device 10 including a locking lever 14. According to FIG. 2, the locking lever 14 is composed of a longitudinal sheet-metal strip containing a fitting bore 52 in which the piston 8 is vertically displaceable. According to FIG. 2, the left-hand end of the locking lever 14 is accommodated in a cut-out portion 15 furnished in the housing part 19.

In addition, the locking lever 14 according to FIG. 2 is screwed and coupled in terms of effect to a bolt 21 on the right-hand side of the pin 8. Bolt 21 extends through the bore 36 provided in the injection tip 13 and is tightly screwed in the threaded bore 37 contained in the locking lever 14. Bolt 21 includes a step 32. Between the step 32 and the upper side 60 of the injection tip 13, a compression spring 16 takes support and draws the locking lever 14 upwardly in such a fashion that the pin 8 with the handle 12 is tied up automatically. The locking lever 14 intersects the longitudinal central axis 41 in an angle 'a' which is slightly larger than 90°. This clamped position of the locking lever 14 lasts as long as the handle 12 is not subjected to pressure in the direction of the filter basket holder 2.

For example, when the piston 25 is to be displaced downwardly by way of the handle 12 to compress the ground espresso coffee 39, due to the downward movement of the pin 8, the locking lever 14, too, is pressed slightly downwards, and the locking engagement between the pin 8 and the locking lever 14 is discontinued for a short time so that the pin 8 can slide easily through the fitting bore 52 of the locking lever 14. As soon as the handle 12 is released again, the bolt 21, through the compression spring 16, draws the locking lever 14 into its clamped position according to FIG. 2 and locks the pin 8 again because the latter cants in the fitting bore 52.

According to FIG. 2, the ground coffee 39 is compressed in the working position, and the hot water can be conveyed through the conduit 20 provided in the piston 25 to the pressure chamber 40 provided in the filter basket, in which the ground coffee 39 to be extracted is contained. The conduit 20 is connected through a connecting pipe, not shown in the drawing, with an electrically operated pump device which pressurizes hot water.

The ready espresso coffee flows through outlet openings 38 provided in the filter basket holder 2 into a cup placed underneath (not shown). In order that the spent ground espresso coffee 39 can be removed from the filter basket 29, first, the right-hand end 61 of the locking lever 14 according to FIG. 2 is pressed downwards so that the press-on arrangement 3, along with the piston 25, the pin 8 and the handle 12, moves from the working position illustrated in FIG. 2 to the feed position illustrated in FIG. 1. This process is caused by the spring 9 which takes support on the upper side 11 of the injection head 13 and, through the handle 12, draws the piston 25 in upward direction.

When the position of the brewing device 1 shown in FIG. 1 is reached, according to FIGS. 4 and 6, the filter basket holder 2 can be swung counterclockwise about the tilting axis 4 in outward direction until the feed position illustrated in these Figures is reached. Subsequently, the filter basket 29, together with the spent ground coffee 39, can be lifted from the filter basket 29, and the ground coffee 39 can be taken out of the filter basket holder 2. Because the filter basket 29 can be removed from the filter basket holder 2 without the filter basket holder 2 itself requiring to be held by a user in the hand, particular ease of handling the filter basket 29 results. The operation of the filter basket 29 can still be simplified in that a handle 62 is provided on the filter basket 29 so as to project therefrom radially (FIG. 4), whereby it is prevented that the hand gets burnt when the still hot filter basket 29 is taken out. The handle 62 is concealed by the cylindrical wall portion 33 when the filter basket 2 is in its swung-in condition.

The brewing device according to FIGS. 5 to 7 differs from that one in FIGS. 1 to 4 only in that, instead of the supporting elements 42, 43 which extend segment-shaped and concentrically relative to the tilting axis 4, the supporting elements now extend concentrically to their central points 47 or 63, respectively, of the housing 19 or the filter basket holder 2, the rear portion 50 of the supporting surfaces 42, 43 extending below the partition plane 55 and the front area 49 of the supporting surfaces 42, 43 extending above the sectional plane 55 according to FIG. 5. These supporting surfaces 42, 43, too, which extend concentrically to the central lines 47, 63 are furnished with reinforcing ribs 45 and 46, respectively.

Figure 5:
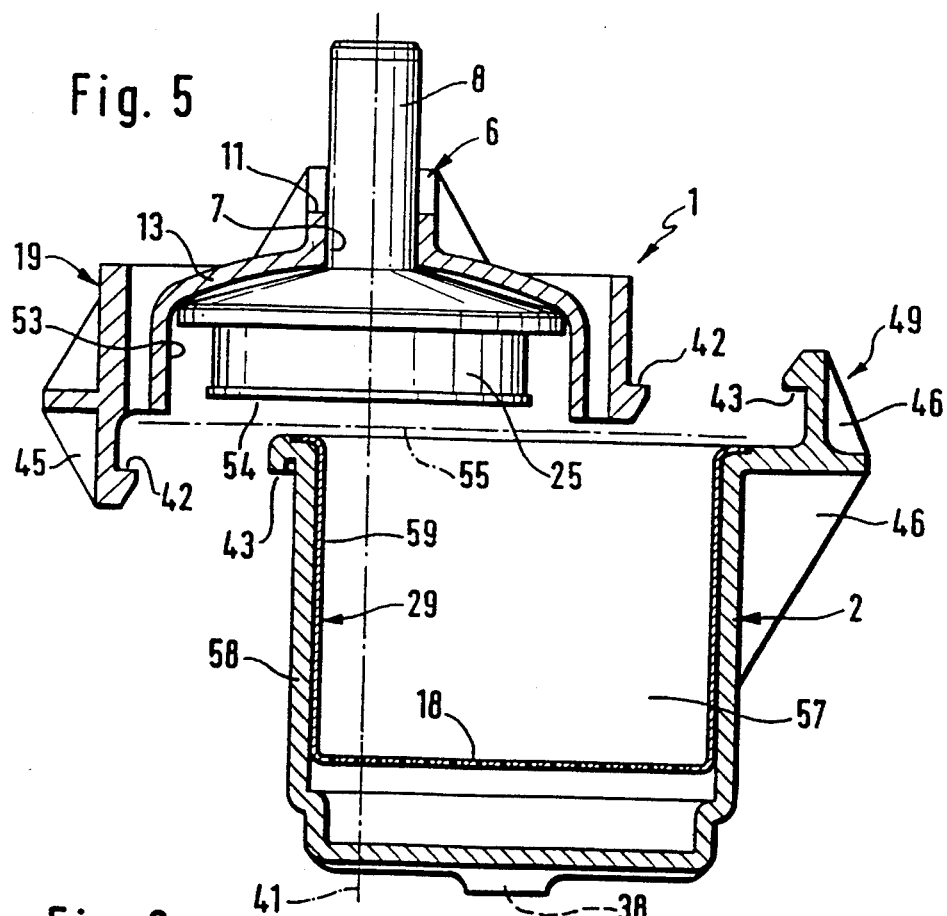
FIG. 5 is a longitudinal cross-section taken through another brewing device, with the supporting device modified in respect of FIGS. 1 to 4, the filter basket holder adopting a partly swung-out position.
Figure 7:
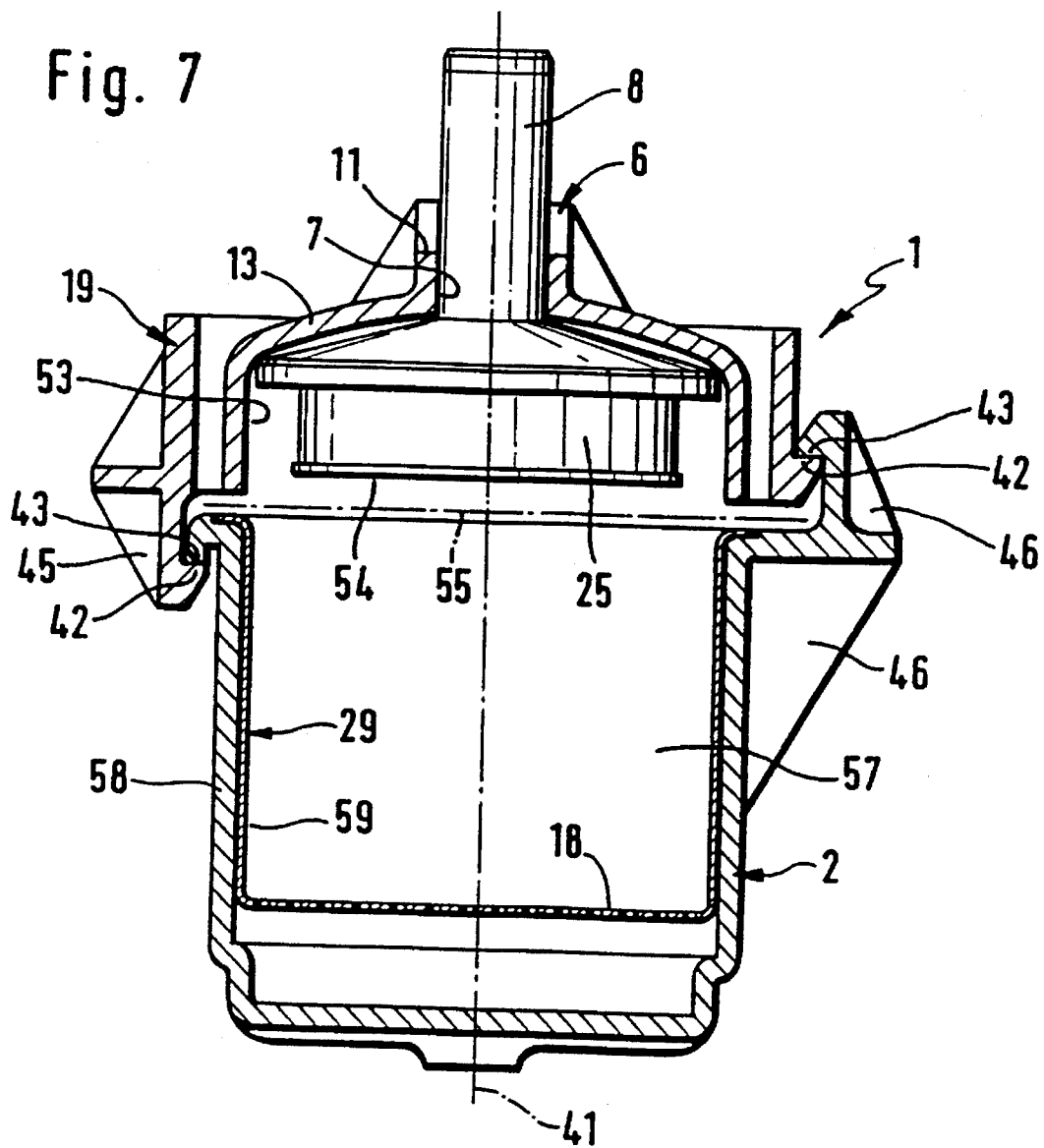
FIG. 7 is a longitudinal cross-section taken through the brewing device illustrated in FIGS. 5 and 6, however, in the "parking" position.

As far as the press-on arrangement 3, the locking device 10 and the support of the filter basket holder 2 at the housing part 19 are concerned, they can be provided in FIGS. 5 to 7 corresponding to the arrangements in FIGS. 1 to 4. For the sake of simplicity, these arrangements are not shown in FIGS. 5 to 7. Also, all the component parts in FIGS. 5 to 7 which are identical to the component parts in FIGS. 1 to 4 have been assigned like reference numerals. Furthermore, as can be seen in FIGS. 5 to 7, the sealing ring 17, as it is shown in FIGS. 1 and 2, was omitted at piston 25.

In addition, it can be seen clearly in FIG. 6 that the transition of the area of the supporting surfaces 42, 43, which is disposed farther below in respect of the partition plane 55 (FIG. 5), ends at the contour 64, while the area of the supporting surfaces 42, 43, which is disposed higher in respect of the partition plane 55, begins with the contour 65.

We claim:

1. A brewing device for a household espresso coffee machine comprising:

a piston having a conduit;

a housing part holding the piston so that it is slidably movable therein between a lowered working position and a lifted position; and a filter basket holder having at least one outlet opening;

the housing part including a pivot support holding the filter basket holder in the housing part such that the filter basket holder is rotatedly movable about a vertically extending axis between a working position vertically aligned with the movement of the piston and a feed position out of the range of effect of the piston, the filter basket holder, in its working position only, secured in respect to the housing part against movement in a vertical direction by supporting elements provided on both the housing part and the filter basket holder;

the filter basket holder which, during operation, retains a filter basket filled with ground coffee, wherein, when the filter basket holder is in its working position, the piston in its lowered working position reaches into the filter basket and forms with it a pressure chamber in which the ground coffee is enclosed, and into which, on the piston side, hot water under pressure is urged through the conduit, and from which, on the filter basket holder side, the prepared espresso coffee beverage is discharged through the at least one outlet opening of the filter basket holder, and wherein, when the filter basket holder is in its feed position, the filter basket is accessible from the outside of the espresso coffee machine.

2. A brewing device as claimed in claim 1 wherein the position of the vertically extending axis is determined by two points of support which are provided on the housing part are disposed outside the range of effect of the piston.

3. A brewing device as claimed in claim 2 wherein the two points of support are mounting lugs, and the filter basket holder is furnished with a pivot pin with ends which can be hung into the mounting lugs, whereby movement of the filter basket holder in a vertical direction is limited.

4. A brewing device as claimed in claim 1 wherein the supporting elements provided on both the housing part and the filter basket holder are spread around the pressure chamber.

5. A brewing device as claimed in claim 4 wherein those supporting elements provided on both the housing part and the filter basket holder which are disposed above a partition plane defined between the housing part and the filter basket holder when the filter basket holder is swung into the housing part, are arranged in a front area of the housing part, and wherein those supporting elements which are disposed below the partition plane when the filter basket holder is swung into the housing part, are arranged in a rear area of the housing part.

6. A brewing device as claimed in claim 5 wherein the supporting elements provided on both the housing part and the filter basket holder extend substantially concentrically in relation to the vertically extending axis.

7. A brewing device as claimed in claim 6 wherein the supporting elements provided on both the housing part and the filter basket holder are provided with reinforcing ribs.

8. A brewing device as claimed in claim 4 wherein the supporting elements provided on both the housing part and the filter basket holder extend concentrically in relation to a central point of the housing part and a central point of the filter basket holder, respectively.

9. A brewing device as claimed in claim 8 wherein a rear portion of the supporting elements provided on both the housing part and the filter basket holder extend below a partition plane defined between the housing part and the filter basket holder when the filter basket holder is swung into the housing part, and a front portion of the supporting elements extend above the partition plane.

10. A brewing device as claimed in claim 9 wherein the supporting elements provided on both the housing part and the filter basket holder are provided with reinforcing ribs.

11. A brewing device as claimed in claim 1 wherein the piston is provided with a press-on arrangement which is slidable in opposition to the effect of a displacement force and is guided in the housing part.

12. A brewing device as claimed in claim 11 wherein the press-on arrangement is slidably accommodated, in opposition to the effect of a spring, in a guide of the housing part extending upwardly in the direction of motion of the piston.

13. A brewing device as claimed in claim 12 wherein the guide for the slidable accommodation of the press-on arrangement is a cylindrical bore provided in the housing part.

14. A brewing device as claimed in claim 13, wherein the guide forming the cylindrical bore extends in parallel to the vertically extending axis of the housing part.

15. A brewing device as claimed in claim 14 wherein the press-on arrangement with the associated piston can be moved to adopt automatically a locking position by displacing the press-on arrangement at least in a position in which the ground coffee is compressed.

16. A brewing device as claimed in claim 11 wherein the displacement force is provided by a spring mounted on a pin incorporated slidably in the cylindrical bore and attached to the press-on arrangement, and, with its one end, moves into abutment with a handle furnished at the pin and, with its other end, moves into abutment with the upper side of an injection tip provided in the housing part.

17. A brewing device as claimed in claim 16 further comprising a locking lever provided at the housing part which extends transversely to the pin and is swivellable about a supporting surface, the locking lever, through a fitting bore, tightly enclosing the pin and forming a friction-type lock with it so that the pin is freely adjustable when the locking lever is depressed into an unlocking position and, when the adjusting pressure is removed to cause a locking position, the pin is undisplaceably coupled to the housing part by the locking lever.

18. A brewing device as claimed in claim 17 wherein the effect of a compression spring constantly keeps the locking lever in its locking position, in which the pin is held undisplaceably.

19. A brewing device as claimed in claim 1 wherein one end of the conduit is open towards the pressure chamber and the other end is connected to a pressurized hot water supply device.

20. A brewing device as claimed in claim 1 wherein the piston, for its displacement, is provided with a press-on arrangement which is composed of a threaded arrangement provided at the housing part and the piston.

21. A brewing device as claimed in claim 1 further comprising a handle provided at the filter basket so as to project radially therefrom.

22. A brewing device as claimed in claim 1 further comprising the filter basket.

23. A brewing device as claimed in claim 22 wherein the filter basket is separate from and insertable into the filter basket holder.

* * * * *